(12) United States Patent
Joo

(10) Patent No.: US 9,590,356 B2
(45) Date of Patent: Mar. 7, 2017

(54) PULLER TYPE CARD SOCKET

(71) Applicant: Molex, LLC, Lisle, IL (US)

(72) Inventor: Sung-Hyuk Joo, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/659,690

(22) Filed: Mar. 17, 2015

(65) Prior Publication Data

US 2015/0263454 A1    Sep. 17, 2015

(30) Foreign Application Priority Data

Mar. 17, 2014    (KR) .................. 10-2014-0031136

(51) Int. Cl.
*G06K 13/08* (2006.01)
*H01R 13/633* (2006.01)
*G06K 7/00* (2006.01)

(52) U.S. Cl.
CPC ....... *H01R 13/6335* (2013.01); *G06K 7/0069* (2013.01); *G06K 13/08* (2013.01)

(58) Field of Classification Search
CPC .............. G06K 13/08; G06K 13/0806; G06K 13/0831; G06K 13/8012; H01R 13/6335
See application file for complete search history.

(56) References Cited

U.S. PATENT DOCUMENTS

| | | | | |
|---|---|---|---|---|
| 6,027,350 A | * | 2/2000 | Chen | H01R 13/633 439/159 |
| 6,814,597 B1 | * | 11/2004 | Kao | H01R 13/633 439/155 |
| 6,991,480 B2 | | 1/2006 | Katayanagi et al. | |
| 7,011,537 B1 | * | 3/2006 | Wu | G06K 13/0806 439/159 |
| 7,427,206 B2 | * | 9/2008 | Takei | G06K 13/0831 439/159 |
| 7,833,063 B2 | | 11/2010 | Matsumoto et al. | |

(Continued)

FOREIGN PATENT DOCUMENTS

KR    2004-0108120 A    12/2004

*Primary Examiner* — Amy Cohen Johnson
*Assistant Examiner* — Matthew T Dzierzynski
(74) *Attorney, Agent, or Firm* — James A. O'Malley

(57) ABSTRACT

The puller type card socket of the Present Disclosure relates to a card socket furnished with a housing and a cover that covers the housing, configured so that a card can be inserted and withdrawn between the housing and the cover. A sliding part is mounted in a sliding groove formed on one side of the interior of the housing to enable sliding along the cover's insertion and withdrawal directions, and a card contact part is formed on the rear end of the sliding part so as to contact with and be pushed by the sloped front end of the card during insertion, and to push the card forward when the card is withdrawn A puller, wherein a pulling part is formed on the front part, is located at the front of the housing to be pulled on when withdrawing the card The card contact part is configured to overlap with the reverse mounting prevention part that prevents reverse mounting of the card when the card has been fully inserted, while on the top of one side wall of the sliding groove, a stopper part is formed that restricts the forward movement of the puller by catching on the card contact part of the puller when the card is withdrawn.

11 Claims, 4 Drawing Sheets

(56) References Cited

U.S. PATENT DOCUMENTS

| | | | | |
|---|---|---|---|---|
| 8,197,272 B2* | 6/2012 | Matsunaga | ............ | G06K 13/08 |
| | | | | 439/160 |
| 9,053,369 B2* | 6/2015 | Wang | ................. | G06K 13/0818 |
| 9,178,325 B2* | 11/2015 | Soo | ........................ | H01R 12/72 |
| 2013/0337672 A1* | 12/2013 | Zhu | .................... | H01R 13/6335 |
| | | | | 439/159 |
| 2014/0315437 A1* | 10/2014 | Soo | ...................... | G06K 7/0021 |
| | | | | 439/626 |

* cited by examiner

PULLER TYPE CARD SOCKET

REFERENCE TO RELATED APPLICATIONS

The Present Disclosure claims priority to prior-filed Korean Patent Application No. 10-2014-0031136, entitled "Puller Type Card Socket," filed on 17 Mar. 2014 with the Korean Patent Office. The content of the aforementioned Patent Application is incorporated in its entirety herein.

BACKGROUND OF THE PRESENT DISCLOSURE

The Present Disclosure relates, generally, to a card socket used in mobile communication terminals, in which cards are inserted and removed by a push-pull mechanism, and, more specifically, to a puller-type card socket wherein the card can readily be withdrawn from the front of the housing.

On mobile communication terminals, authentication cards that enable authentication with respect to personal information and credit transactions, and memory cards for storing data when using diverse kinds of content, are respectively furnished. In the main body of the mobile communication terminal, a card socket for inserting a card is mounted on a printed circuit board. Card sockets are classified as either push-pull type or push-push type, depending on the manner of inserting and withdrawing the card. In the case of the push-pull type, the user pulls on the card to withdraw it, while in the case of the push-push type, the card is removed from the socket by the user pushing on the card to release the lock.

A card socket in which the card is withdrawn in push-push fashion has been developed by the present applicants and is disclosed for example in Republic of Korea Patent No. 10-0513836, the content of which is hereby incorporated herein in its entirety. Push-push types, such as that disclosed in the '836 Patent, have the advantage that the card can be withdrawn more easily than in the push-pull type, but are problematic in that they are complex and expensive to fabricate.

A card socket in which the card is withdrawn in push-pull fashion is disclosed in Republic of Korea Patent No. 10-1113629, the content of which is hereby incorporated herein in its entirety. The '629 Patent has the advantage that the card can readily be withdrawn using the eject member, but has a problematically complex configuration in order to afford movement of the eject member, including furnishing a spring part on the cover, and forming complex grooves on the top surface of the eject member so as to catch the end of the spring part. In addition, because no separate configuration is disclosed for preventing the inserted card from slipping out, the reliability of card insertion and the reliability of contact with the contact terminals are impaired.

SUMMARY OF THE PRESENT DISCLOSURE

The Present Disclosure has been devised in order to resolve the aforementioned disadvantages, and has, as an objective, providing a puller-type card socket that is configured to enable withdrawal of the card by a push-pull mechanism and straightforward withdrawal of the card from the front due to its structural simplicity, and that enables increased reliability of card insertion and reliability of contact with the contact terminals.

The puller type card socket of the Present Disclosure relates to a card socket furnished with a housing and a cover that covers the housing, configured so that a card can be inserted and withdrawn between the housing and the cover. A sliding part is mounted in a sliding groove formed on one side of the interior of the housing to enable sliding along the cover's insertion and withdrawal directions, and a card contact part is formed on the rear end of the sliding part so as to contact with and be pushed by the sloped front end of the card during insertion, and to push the card forward when the card is withdrawn. A puller, wherein a pulling part is formed on the front part, is located at the front of the housing to be pulled on when withdrawing the card. The card contact part is configured to overlap with the reverse mounting prevention part that prevents reverse mounting of the card when the card has been fully inserted, while on the top of one side wall of the sliding groove, a stopper part is formed that restricts the forward movement of the puller by catching on the card contact part of the puller when the card is withdrawn.

On the card contact part, a sloped face is formed that contacts the sloped forward surface of the card. The card contact part is formed by bending the rear end of the sliding part horizontally to one side. To facilitate the bending of the card contact part, a bending groove is formed on the rear end of the sliding part.

On the sloped face of the card contact part, a contact area expansion part is formed that is bent downward to expand the contact area with the card. A bending groove is formed on the contact area to facilitate bending of the contact area expansion part.

On the reverse mounting prevention part, an overlapping lip is formed so as to overlap with the contact area expansion part so that the sloped face of the reverse mounting prevention part will coincide with the sloped face of the card contact part. The stopper part is in the form of a tab. The puller is prevented from detaching by the cover. The pulling part is formed by bending the front end of the sliding part to the side or up or down.

Thus, the puller-type card socket of the Present Disclosure has, inter alia, the following effects. First, it is configured to enable the card to be forcibly removed using a puller having a simple structure in a card socket with a push-pull mechanism. As a result, because it has a simpler structure than the card sockets with conventional push-pull mechanisms, the card can readily be withdrawn from the front of the housing, and the costs of fabrication are lower. As the unit cost of fabrication of the card socket is reduced, the unit cost of the mobile communication terminals using the socket is also reduced. Second, because it is configured so that the card contact part of the puller will overlap with the reverse mounting prevention part of the housing when the card has been fully inserted, the overall volume of the card socket can be greatly reduced, and the space into which the card is inserted can also be greatly reduced. Third, because a stopper is formed in the housing to restrict the forward sliding of the puller, the sliding range of the puller can be restricted so that the puller does not become completely separated from the card socket. Fourth, because a card pushing part is furnished on the cover by which the card is pushed, the insertion status of the card and the contact with the contact terminal can be kept stable. Fifth, because a card contact part, and a contact area expansion part formed on the card contact part, are formed as a single unit by bending from the sliding part and card contact part respectively, the fabrication of the puller can be facilitated.

BRIEF DESCRIPTION OF THE FIGURES

The organization and manner of the structure and operation of the Present Disclosure, together with further objects

DETAILED DESCRIPTION

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, forward and rearward, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
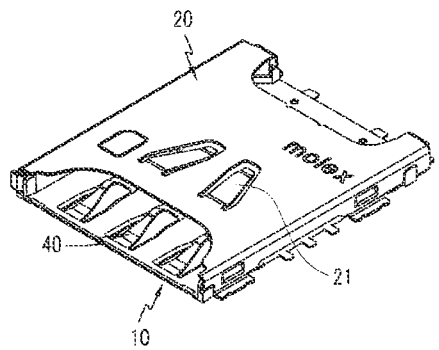
FIG. 1 is an oblique view of the puller-type card socket according to an embodiment of the Present Disclosure.
Figure 2:
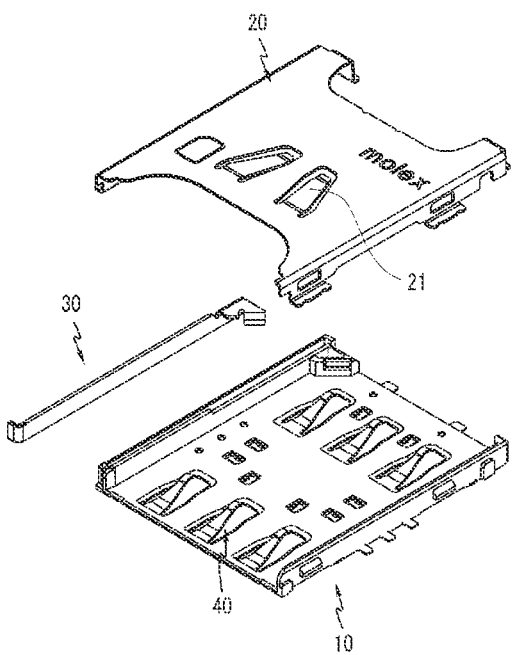
FIG. 2 is an exploded view of FIG. 1.
Figure 3:
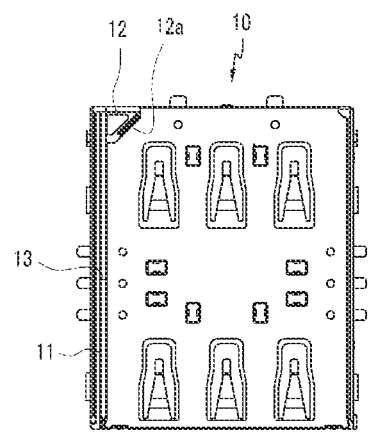
FIG. 3 is a top view of the housing shown in FIG. 2.
Figure 4:
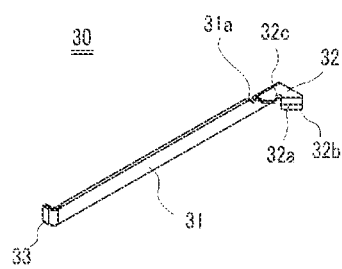
FIG. 4 is an oblique view of a puller.
Figure 5:
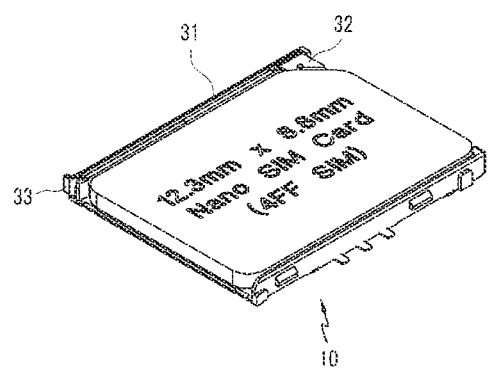
FIG. 5 is an oblique view showing the position of the puller of FIG. 4, when the card has been fully inserted.
Figure 6:
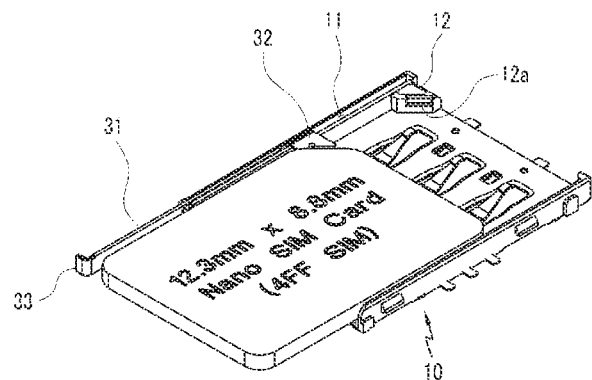
FIG. 6 is an oblique view showing the puller of FIG. 4 being pulled in order to withdraw the card.

Referring to FIGS. 1-2, the puller type card socket of the Present Disclosure comprises a housing 10, cover 20 and puller 30. In the housing 10, a card insertion space is formed of an insulating material, into the top part of which a card is inserted; this card insertion space is covered by the cover 20. On the bottom surface of the card insertion space of the housing 10, contact terminals 40 are formed that contact the card 1.

The cover 20 is joined to either side of the housing 10, and covers the card insertion space and the contact terminals 40. On the cover 20, a card pushing part 21, which pushes the inserted card 1 downward to maintain stable contact between the card 1 and the contact terminals 40 and prevents the card 1 from slipping out when inserted, is formed as a single unit by bending. The card pushing part 21 is bent in the same direction in which the card 1 is inserted, which facilitates card insertion.

The puller 30 is mounted slidably on one side of the housing 10 so that the card 1 can be readily withdrawn from the front. The puller 30 is furnished so as to slide in the card's insertion and withdrawal directions, so that when withdrawing the card 1, if the user pulls forcibly on the puller 30 in the withdrawal direction, the puller 30 forcibly withdraws the card 1 by pulling it in the withdrawal direction. When the card 1 is inserted, the puller 30 is slid in the card insertion direction by the action of inserting the card 1.

Referring to FIGS. 3-6, on one side of the card insertion space of the housing 10, a sliding groove 11 is formed in the front-to-back direction, along which the puller 30 is inserted so as to be able to slide in the front-to-back direction. On one side of the rear end of the card insertion space, a sloped face is furnished corresponding to the sloped face formed on the front end of the card 1, so as to form a reverse mounting prevention part 12 that prevents the reverse mounting of the card 1. The reverse mounting prevention part 12 is formed in a triangular shape when viewed from above.

The puller 30 comprises a sliding part 31 having a flat shape that is inserted slidably into the sliding groove 11; a card contact part 32 that extends laterally from upper side of the rear end of the sliding part 31 so as to be pushed by the card 1 when the card 1 is inserted, and pushes the card 1 in the card withdrawal direction when the card 1 is withdrawn; and a pulling part 33 that is bent laterally from the front end of the sliding part 31 so as to enable the user to pull it when withdrawing the card 1. The pulling part 33 may also be formed by bending the front end of the sliding part 31 upward or downward, instead of laterally.

The card contact part 32 contacts the sloped front surface of the card 1 when the card 1 is inserted and withdrawn. It has a sloped face 32a that contacts the sloped front end of the card 1, formed at a slope corresponding to the sloped front end of the card 1. This card contact part 32 is formed in a shape corresponding overall to the reverse mounting prevention part 12 when viewed from above. When the card 1 has been fully inserted, it overlaps with the reverse mounting prevention part 12 while covering the reverse mounting prevention part 12. On part of the sloped face 32a of the card contact part 32, a contact area expansion part 32b is formed that expands the area of contact with the card 1.

The card contact part 32 is formed by bending the top of the rear end of the sliding part 31 laterally and horizontally. The contact area expansion part 32b is formed by bending part of the sloped face 32a of the card contact part 32 vertically downward. Bending grooves 31a, 32c are formed respectively on the rear end of the sliding part 31 and the sloped face 32a of the card contact part 32 to facilitate the bending of the card contact part 32 and contact area expansion part 32b. On the reverse mounting prevention part 12 of the housing 10, an overlapping lip 12a is formed so as to overlap the contact area expansion part 32b of the card contact part 32, so that the sloped face of the reverse mounting prevention part 12 will match the sloped face 32a of the card contact part 32.

The puller 30 is covered by the cover 20 so as to prevent detachment upward. Forward movement is restricted by the stopper part 13 formed on the sliding groove 11. Specifically, at a certain location on the sliding groove 11, a stopper part 13 having a tab shape is formed on the top of one side wall of the sliding groove 11, in order to prevent the complete detachment of the puller 30 from the front of the housing 10 when the card is being withdrawn by pulling the puller 30 forward. The card contact part 32 of the puller 30 catches on the stopper part 13 so as to restrict forward sliding.

Figure 7:
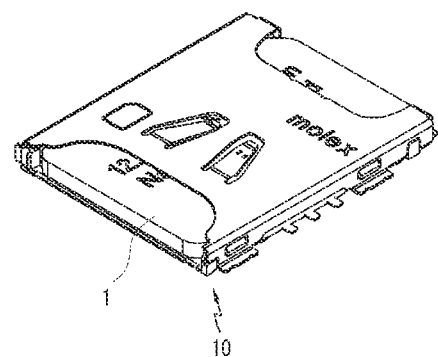
FIG. 7 is an oblique view of a card socket, showing the card inserted.
Figure 8:
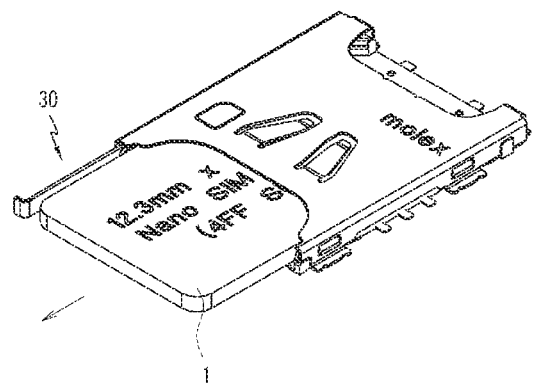
FIG. 8 is an oblique view of the card socket of FIG. 7, showing the card being withdrawn.

Referring to FIGS. 7-8, when the card 1 is pushed into the card insertion space formed in the housing 10, the puller 30 is pushed by the front end of the card 1 and slid into the card insertion space. When the card 1 has been fully inserted, the sloped front end of the card 1 contacts the sloped face of the reverse mounting prevention part 12 within the card insertion space. If the sloped front end of the card 1 does not contact the sloped face of the reverse mounting prevention part 12, the insertion direction of the card 1 is incorrect and therefore the card 1 is reversed and re-inserted.

If the card 1 is properly fully inserted, the card contact part 32 of the puller 30 overlaps with the reverse mounting prevention part 12 and the sloped surface of the reverse mounting prevention part 12 and the sloped surface of the card contact part 32 both simultaneously contact the sloped front end of the card 1. When the card 1 has been completely inserted, the pulling part 33 of the puller 30 catches on the front end of the housing 10, restricting further insertion. Accordingly, the pulling part 33 of the puller 30 is pulled when the card 1 is withdrawn. When the pulling part 33 of the puller 30 is pulled forward in order to withdraw the card 1, the card contact part 32 of the puller 30 is moved forward, and the front end of the card 1 is pushed in the withdrawal direction. When the card 1 has been withdrawn to some degree, the card contact part 32 of the puller 30 catches on the stopper part 13 formed on the sliding groove 11 of the housing 10, and consequently forward sliding of the puller 30 is restricted. The card 1 that has been withdrawn to some extent can then be grasped by the user's hand or other tool and withdrawn fully.

Figure 9:
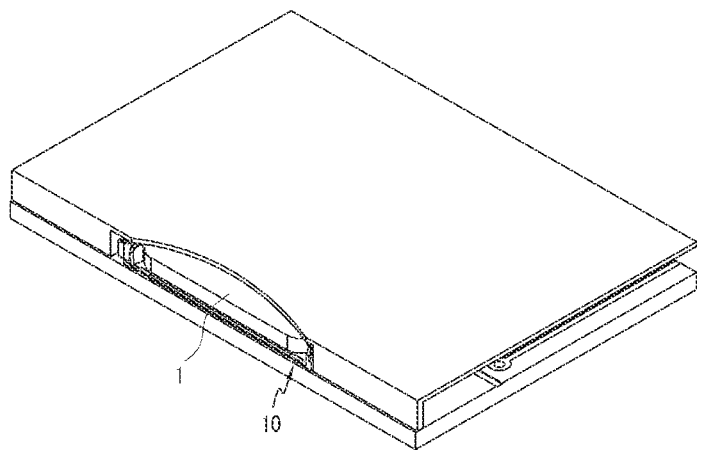
FIG. 9 is an oblique view showing a set using the card socket of FIG. 7, with the card inserted.
Figure 10:
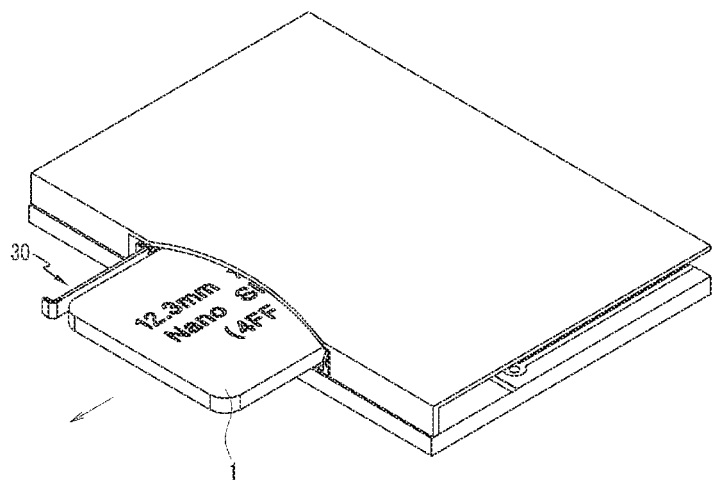
FIG. 10 is an oblique view showing a set using the card socket of FIG. 7, with the card being withdrawn.

Referring to FIGS. 9-10, even in a set in which the top surface of the socket is entirely blocked by the set and only the front part into which the card 1 is inserted is open, the insertion and withdrawal of the card 1 is facilitated using the puller 30.

A preferred embodiment of the Present Disclosure was described in detail above. However, the Present Disclosure is not limited to the embodiment described above. Various modifications and improvements are possible within the spirit of Present Disclosure described in the claims.

What is claimed is:

1. A card socket in which a card can be inserted and withdrawn, the card socket comprising:
   a housing, the housing defining a sliding groove, a reverse mounting prevention part, and a stopper part, the sliding groove being formed on one side of an interior of the housing, the reverse mounting prevention part preventing the reverse mounting of the card;
   a cover, the cover covering the housing, the cover being configured so that the card can be inserted and withdrawn between the housing and the cover; and
   a puller, the puller having a sliding part, a pulling part and a card contact part, the sliding part being mounted in the sliding groove and being able to slide along the insertion and withdrawal directions of the card, the sliding part having a front end and a rear end, the pulling part being provided at the front end of the sliding part, the pulling part being configured to be pulled on when withdrawing the card, the card contact part being provided at the rear end of the sliding part, the card contact part being configured to overlap with the reverse mounting prevention part, the card contact part configured to be pushed by the card during insertion, the card contact part configured to push the card forward when the card is withdrawn, wherein when the card is withdrawn, the card contact part is configured to catch on the stopper part, thereby restricting the forward movement of the puller.

2. The card socket of claim 1, wherein the puller is prevented from detaching upward detachment by the cover.

3. The card socket of claim 1, wherein the pulling part is formed by bending the front end of the sliding part.

4. The card socket of claim 1, wherein the card contact part has a sloped face formed thereon which is configured to contact a sloped front end of the card.

5. The card socket of claim 1, wherein the card contact part is formed by bending the rear end of the sliding part.

6. The card socket of claim 5, wherein, to facilitate the bending of the card contact part, a bending groove is formed at the rear end of the sliding part.

7. The card socket of claim 4, wherein the sloped face of the card contact part has a contact area expansion part formed thereon, the contact area expansion part being bent downward to expand a contact area with the card.

8. The card socket of claim 7, wherein a bending groove is formed on the puller, the bending groove facilitating bending of the contact area expansion part.

9. The card socket of claim 7, wherein the reverse mounting prevention part has a sloped face and an overlapping lip formed thereon, the overlapping lip overlapping with the contact area expansion part so that the sloped face of the reverse mounting prevention part will coincide with the sloped face of the card contact part.

10. The card socket of claim 1, wherein the stopper part has the form of a tab.

11. The card socket of claim 1, wherein the stopper part is formed on a top of a side wall of the sliding groove.

* * * * *